(12) United States Patent
Ishizaki et al.

(10) Patent No.: US 7,722,003 B2
(45) Date of Patent: May 25, 2010

(54) DISPLAY ELEVATION ADJUSTING APPARATUS

(75) Inventors: Takashi Ishizaki, Shizuoka (JP); Kenichi Hirasawa, Tokyo (JP)

(73) Assignees: Murakami Corporation, Shizuoka-shi (JP); NEC Display Solutions, Ltd., Tokyo (JP)

( * ) Notice: Subject to any disclaimer, the term of this patent is extended or adjusted under 35 U.S.C. 154(b) by 938 days.

(21) Appl. No.: 10/582,142

(22) PCT Filed: Oct. 29, 2004

(86) PCT No.: PCT/JP2004/016083

§ 371 (c)(1),
(2), (4) Date: Jun. 8, 2006

(87) PCT Pub. No.: WO2005/062283

PCT Pub. Date: Jul. 7, 2005

(65) Prior Publication Data

US 2007/0102600 A1     May 10, 2007

(30) Foreign Application Priority Data

Dec. 18, 2003    (JP) .............................. 2003-420391

(51) Int. Cl.
*F16M 11/04*    (2006.01)

(52) U.S. Cl. ................ 248/295.11; 248/920; 248/125.1
(58) Field of Classification Search ............ 248/295.11, 248/297.21, 297.11, 123.11, 125.1, 125.2, 248/122.1, 917, 919, 920

See application file for complete search history.

(56) References Cited

U.S. PATENT DOCUMENTS

| 3,905,311 | A | * | 9/1975 | Carpentier | .................. 108/136 |
| 6,712,321 | B1 | * | 3/2004 | Su et al. | ................. 248/123.11 |
| 6,874,738 | B2 | * | 4/2005 | Ishizaki et al. | ........... 248/176.3 |
| 6,874,743 | B2 | * | 4/2005 | Watanabe et al. | ........ 248/276.1 |
| 6,918,564 | B2 | * | 7/2005 | Yen et al. | ..................... 248/404 |
| 7,198,240 | B2 | * | 4/2007 | Chen | ....................... 248/284.1 |
| 2003/0121124 | A1 | * | 7/2003 | Chen | ........................... 16/339 |
| 2004/0113031 | A1 | * | 6/2004 | Sung | .......................... 248/146 |
| 2004/0118984 | A1 | * | 6/2004 | Kim et al. | ................... 248/149 |

FOREIGN PATENT DOCUMENTS

| JP | 3063920 | 9/1999 |
| JP | 3095671 | 5/2003 |
| JP | 3098199 | 9/2003 |
| JP | 2003-302915 | 10/2003 |
| WO | WO 03/050787 A1 | 6/2003 |

OTHER PUBLICATIONS

Japanese Office Action dated Aug. 25, 2009.

* cited by examiner

*Primary Examiner*—J. Allen Shriver, II
*Assistant Examiner*—Steven M Marsh
(74) *Attorney, Agent, or Firm*—Kratz, Quintos & Hanson, LLP

(57) ABSTRACT

Spiral springs (20) pressing a lift member (30) in an upward direction is arranged so that wound-up portions (20*b*) thereof move up and down along lift paths (13*a*, 13*b*) according as the lift member (30) moves up and down. In each lift path (13*a*, 13*b*) is provided a push-fit portion (40) of which a width is narrower than an outer diameter of the wound-up portion (20*b*) of the spiral spring (20), and in which according as the lift member (30) is lowered, the wound-up portion (20*b*) is fitted in such a manner that the wound-up portion becomes radially compressed. Accordingly, a cost-efficient and universally applicable display elevation adjusting apparatus can be provided which can make the operation feeling at the time of raising adjustment constant and can attain adjustment to suit the preference.

3 Claims, 12 Drawing Sheets

DISPLAY ELEVATION ADJUSTING APPARATUS

TECHNICAL FIELD

The present invention relates to a display elevation adjusting apparatus.

BACKGROUND ART

Conventionally, as a display supporting device for use with a personal computer (hereinafter referred to as "PC") and a television receiver, a supporting device 100 for a liquid crystal monitor as shown in FIG. 12 is known. As shown in FIG. 12, this supporting device 100 includes: a base portion 101; a supporter 102 installed on and directed upward from this base portion 101; an elevator 103 installed in, and allowed to move up and down relative to, this supporter 102; and a movable unit 104 that is installed on an upper portion of this elevator 103, tiltably about a support shaft 103a in directions indicated by arrows Y2 in FIG. 12.

A helical spring 102a is contained inside the supporter 102, and by this helical spring 102a, the elevator 103 is pressed in an upward direction (indicated by an arrow Y1 in FIG. 12). An attachment 104a to which a display D is to be attached is provided on the movable unit 104, and by this attachment 104a, the display D is held rotatably in directions indicated by an arrow Y3 in FIG. 12.

According to such a supporting device 100, the elevator 103 can be slid upwardly and downwardly relative to the supporter 102, and the height of the display D can be changed so as to suit the preference of a user. At that time, since the elevator 103 is being pressed in the upward direction (as indicated by the arrow Y1 in FIG. 12) by the helical spring 102a, the operation for moving the display D in the upward direction can be smoothly performed with a light operation force (for example, refer to Japanese Utility Model Registration No. 3063920, pages 6 and 7, FIG. 1 and FIG. 2).

However, the conventional supporting device 100 has the following known problems. Since the supporting device 100 uses the helical spring 102a as a pressing force applying means, the pressing force would correspond to the height of the elevator 103 (the compression state of the spring). For this reason, the operation feeling at the time of the raising adjustment would correspond to the compression state of the spring and could not be adjusted to the operation feeling fit to the preference of the user.

Also, the operation feeling at the time of the raising adjustment could not be made constant, irrespective of the height of the elevator 103. For example, the raising operation force required when the display D is located at a higher position is stronger than that required when the display D is located at a lower position.

With this in view, as a countermeasure for making the operation feeling at the time of the raising adjustment constant, the use of a spiral spring instead of the helical spring 102a could be conceived. Generally speaking, although the pressing force of the spiral spring is constant as compared with the helical spring, the pressing force is still not strictly uniform irrespective of the unwound quantity; as the unwound quantity is increased, the pressing force is made stronger nevertheless. For this reason, even if the spiral spring is employed instead of the helical spring 102a, when the elevator 103 is located at a lower position, the unwound quantity of the spiral spring becomes greater, which would quite likely increase the pressing force. Thus, this countermeasure cannot make the operation feeling at the time of the raising adjustment constant.

Considering the universal applicability of the supporting device 100, it would be advantageous that a single type of the supporting device 100 is designed to be usable for various types of display D. However, when the displays D that may be different in production weight from one model to another are supported equally by the same type of supporting device 100, there is a fear that the operation feeling at the time of the raising adjustment is different for each model. For this reason, the necessity of taking a countermeasure, such as preparation of the helical spring 102a adjusted for each model, would arise, which increases the cost accordingly.

DISCLOSURE OF INVENTION

The present invention is proposed in view of the above-mentioned circumstances. That is, it is one aspect of the present invention to provide a display elevation adjusting apparatus that can make the operation feeling at the time of the raising adjustment constant and can attain adjustment to suit the preference.

Moreover, it is another aspect of the present invention to provide a display elevation adjusting apparatus that can make the operation feelings at the times of the raising adjustments unchanged, even when a display of different type is installed, and that is low in cost and excellent in universal applicability.

More specifically, the display elevation adjusting apparatus in one aspect of the present invention includes: a base member; a lift member which is provided in, and allowed to move up and down along, a lift path formed in the base member and to which a display is to be attached; and a spiral spring which is placed between the base member and the lift member to press the lift member in an upward direction relative to the base member. The spiral spring has a winding end fixed on the base member, and is wound up and off according as the lift member moves up and down with a wound-up portion thereof moving up and down along the lift path while keeping in contact with the lift member located upward. The lift path has a push-fit portion of which a width is narrower than an outer diameter of the wound-up portion, and in which push-fit portion, according as the lift member is lowered, the wound-up portion is fitted in such a manner that the wound-up portion becomes radially compressed.

According to such a display elevation adjusting apparatus, the lift member is provided in, and allowed to move up and down along, the lift path formed in the base member, and is pressed by the spiral spring in the upward direction relative to the base member; thus, the adjustment to the upward direction of the display can be carried out with a light operation force by utilizing the pressing force (resilience) of the spiral spring.

When the lift member is lowered, the wound-up portion is lowered in accordance with the lift member, and fitted into the push-fit portion formed in the lift path, because the spiral spring is wound up and off according as the lift member moves up and down with the wound-up portion moving up and down along the lift path, and the lift path has a push-fit portion of which a width is narrower than the outer diameter of the wound-up portion, and in which according as the lift member is lowered, the wound-up portion is fitted in such a manner that the wound-up portion becomes radially compressed. The push-fit portion is narrower in width than the outer diameter of the wound-up portion, and the wound-up portion is fitted in such a manner that the wound-up portion becomes radially compressed; thus, when the wound-up portion is fitted into the push-fit portion, its circumference comes in strong contact with the push-fit portion and is held with the friction force proportional to the resistance force caused by the spring force in the radial direction. That is, the friction force proportional to this resistance force acts in opposition to the pressing force of the spiral spring. As a result, the pressing force in the upward direction against the lift member is made weaker. Hence, providing the push-fit portion at a desirable position in the lift path makes it possible to adjust the operation feeling at the time of the raising adjustment and obtain the operation feeling to suit the preference of the user.

The longer the push-fit portion formed in the elevation direction of the lift path is, the longer the state where the wound-up portion is fitted in the push-fit portion can be. Consequently, the operation feeling at the time of the raising adjustment can be adjusted well for a long range of the lift path.

In the display elevation adjusting apparatus as described above, the push-fit portion may be formed such that its width becomes narrower toward downward of the lift path.

According to such a display elevation adjusting apparatus, since the push-fit portion is formed such that the width becomes narrower toward downward of the lift path, the friction force proportional to the resistance force of the wound-up portion fitted in the push-fit portion becomes stronger as the lift member is located at the lower portion. That is, the pressing force of the spiral spring which is increased with the lowering of the lift member can be cancelled out by the opposite force caused by the friction force which is made stronger as this lift member is located at the lower portion. Hence, an adjustment can be made so that the operation feeling at the time of the raising adjustment is kept constant.

For example, the pressing force of the spiral spring would be increased when the spiral spring comes in the vicinity of the lower end of the lift member, as compared with that in the initial state of unwinding of the spiral spring. However, the increased pressing force is reduced by the opposite force caused by the friction force which is made stronger as the lift member is located at the lower portion. As a result, even in the vicinity of the lower end of the lift member, the raising adjustment can be made with the operation force unchanged from that which is required when the spiral spring starts unwinding.

In the display elevation adjusting apparatus as described above, the push-fit portion may be formed by a space member attached to the lift path of the base member.

According to such a display elevation adjusting apparatus, the space member for forming the push-fit portion is attached to the lift path of the base member, to form the push-fit portion in the lift path. Thus formed in the lift path of the base member by retrofit can be the push-fit portion such that the operation feeling at the time of the raising adjustment can be set at a desirable operation feeling.

In the display elevation adjusting apparatus as described above, the space member can be attachable to and detachable from the lift path of the base member.

According to such a display elevation adjusting apparatus, since the space member is attachable to and detachable from the lift path of the base member, the operation feeling at the time of the raising adjustment to a desirable operation feeling can be set by attaching the space member to the lift path, while the original operation feeling can be restored by detaching the space member from the lift path. Several kinds of the space members for providing desired inside widths in the lift path may be prepared such that any space member selected among them can be attached. Consequently, the operation feeling at the time of the raising adjustment can be adjusted to suit the preference of the user.

In this case, when the display elevation adjusting apparatus is configured as an apparatus applicable to various displays, the following operability and effect are obtained if the several kinds of the space members are prepared in accordance with the product weights of displays to be attached. That is, when the display elevation adjusting apparatus is configured as an apparatus applicable to various displays, if one of the displays whose product weights are different is attached to the apparatus as it is, the balance between the product weight and the pressing force of the spiral spring would be different from one display to another. Thus, the operation feeling at the time of the raising adjustment would become different depending on the product weight of the attached display.

Under the circumstances, if the moderate resistance force corresponding to the product weight of the display can be applied against the pressing force of the spiral spring, even if the product weight of the display is different, the operation feeling at the time of the raising adjustment can be kept unchanged. So, the several kinds of the space members that can each apply a moderate resistance force corresponding to the product weight of the display are prepared, among which one kind of the space members corresponding to the display is attached. Thus, it is possible to attain the display elevation adjusting apparatus where the operation feeling at the time of the raising adjustment remains unchanged. Consequently, in contrast to the conventional techniques, preparation of various kinds of pressing force applying means (springs) are not required. Hence, it is possible to obtain the display elevation adjusting apparatus which is low in cost and excellent in universal applicability.

A display elevation adjusting apparatus as another aspect of the present invention includes: a base member; a lift member which is provided in, and allowed to move up and down along, a lift path formed in the base member and to which a display is to be attached; and a spiral spring which is provided between the base member and the lift member and which is wound up and off according as the lift member moves up and down, to press the lift member in an upward direction relative to the base member. Further provided between the base member and the lift member is a damper to reduce a speed of upward movement of the lift member when the lift member is located at a lower position.

According to such a display elevation adjusting apparatus, the lift member is provided in, and allowed to move up and down along, the lift path formed in the base member, and is pressed in the upward direction relative to the base member by the spiral spring of which a wound-up portion is wound up and off according as the lift member moves up and down; thus, the adjustment to the upward direction of the display can be made with a light operation force by using the pressing force (resilience) of the spiral spring.

Since the damper for reducing the speed of upward movement of the lift member when the lift member is located at a lower position is provided between the base member and the lift member, a resistance force, which acts when the raising adjustment is performed to the lift member located at a lower position, can be applied to the lift member. As a result, the pressing force caused by the spiral spring can be reduced. Consequently, a phenomenon in which the lift member jumps up sharply when the raising adjustment is performed to the lift member can be prevented, and the operation feeling at the time of the raising adjustment can be adjusted, so that the operation feeling corresponding to the preference of the user can be obtained.

The above aspects and advantageous effects of the present invention and other advantages and additional features will become more apparent from the detailed description of the exemplary and nonrestrictive embodiments of the present invention, which will be given below with reference to accompanying drawings.

BEST MODES FOR CARRYING OUT THE INVENTION

Figure 1:
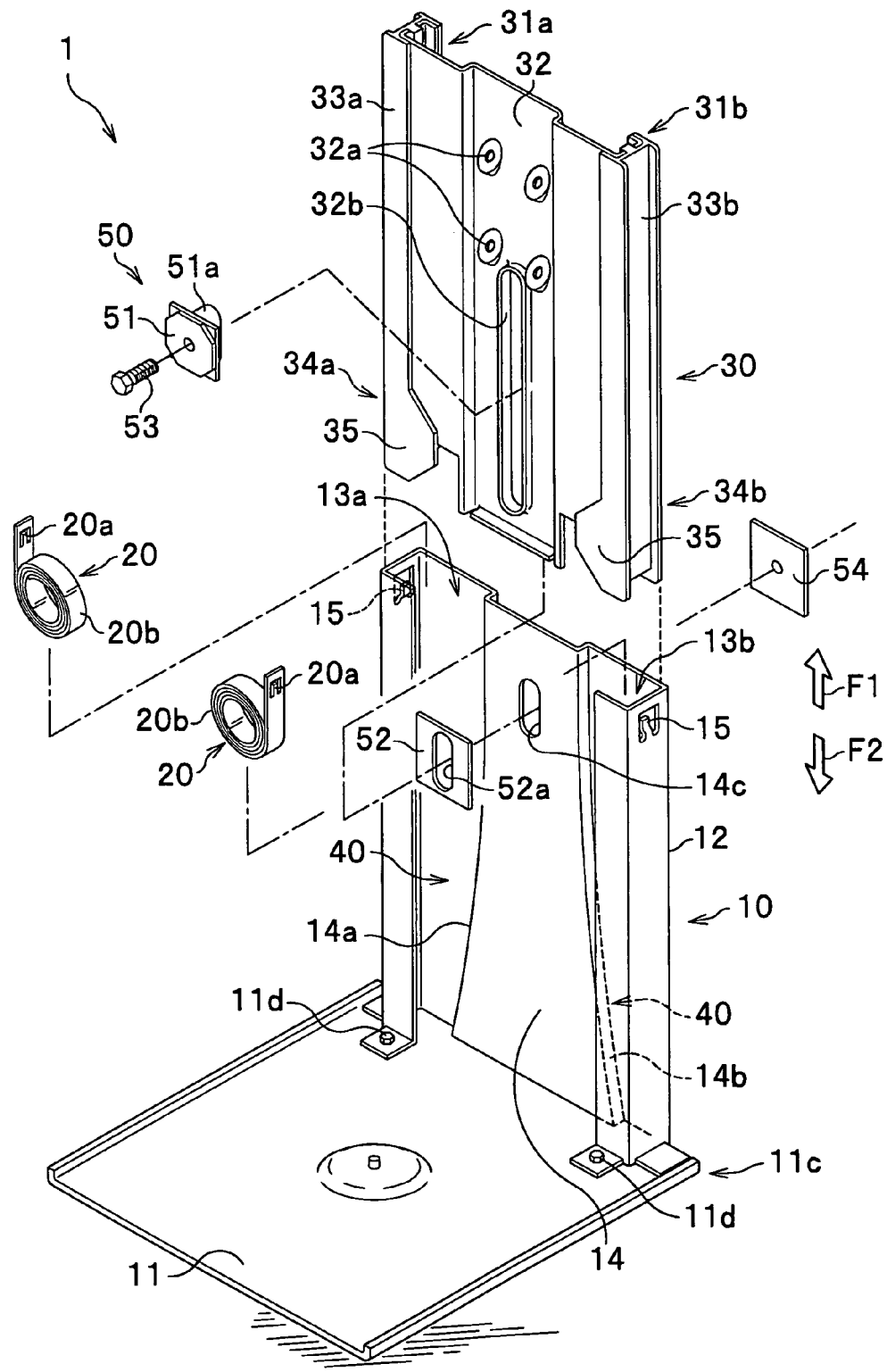
FIG. 1 is an exploded perspective view showing a display elevation adjusting apparatus according to a first embodiment of the present invention.

Embodiments of the present invention will be described below in detail with reference to the accompanying drawings. In the following description, the same reference character is used for the same component, and a duplicate explanation is omitted.

First Embodiment

Figure 2:
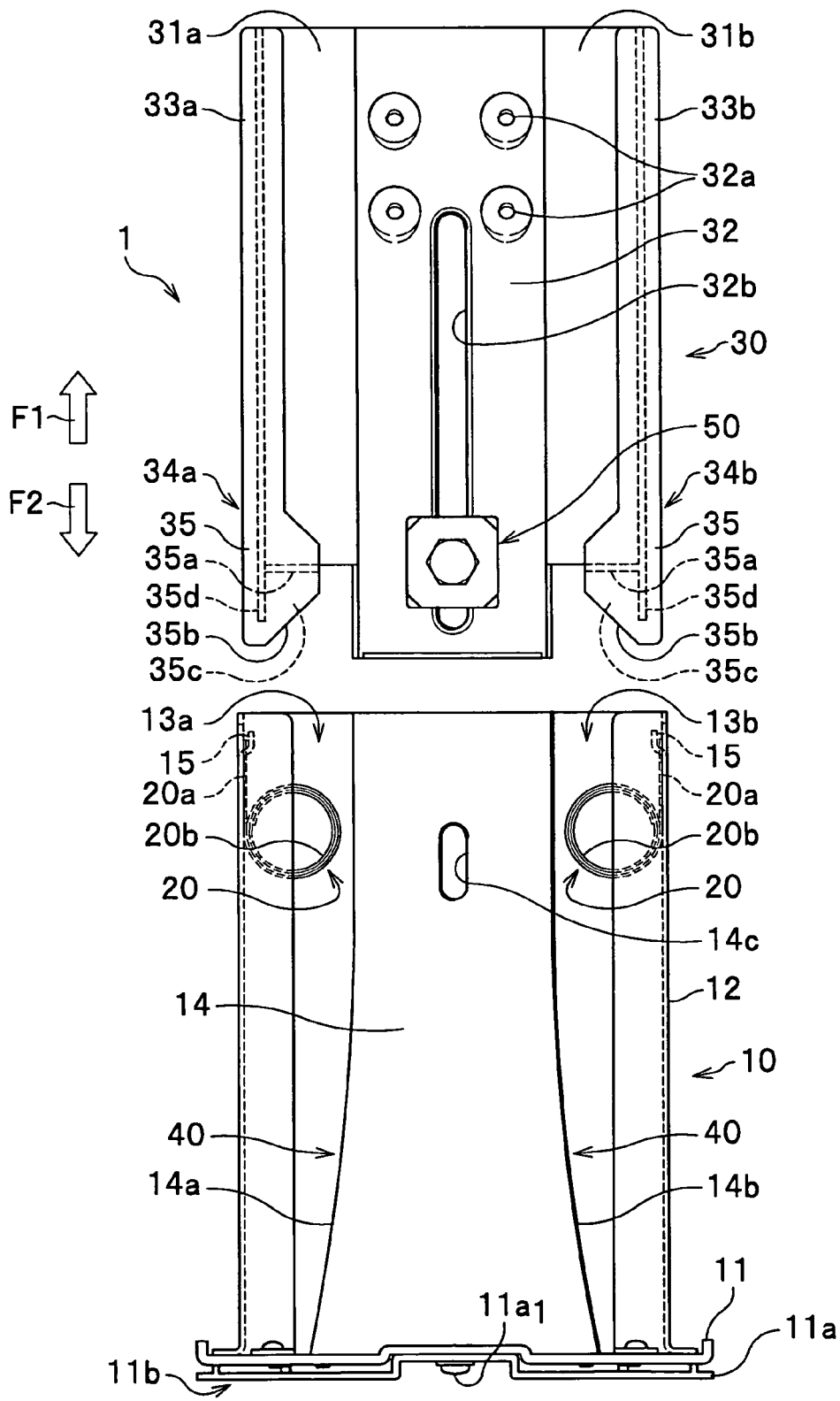
FIG. 2 is a front view of a base member and a lift member that are separated.

As shown in FIGS. 1 and 2, a display elevation adjusting apparatus 1 in this embodiment includes: a base member 10; a lift member 30 which is provided in, and allowed as to move up and down along lift paths 13a, 13b formed in a holder 12 of this base member 10 and to which a display for a PC is to be attached; and spiral springs 20, 20 which are placed between the holder 12 of the base member 10 and the lift member 30 to press the lift member 30 in an upward direction relative to the base member 10. The spiral springs 20, 20 are configured such that their wound-up portions 20b, 20b are wound up and off according as the lift member 30 moves up and down, to move up and down the lift paths 13a, 13b of the holder 12. In the lift paths 13a, 13b, push-fit portions 40, 40 are provided of which widths are narrower than the outer diameters of the wound-up portions 20b, 20b of the spiral springs 20, 20, and in which may be fitted the wound-up portions 20b, 20b while compressed radially. That is, in this display elevation adjusting apparatus 1, the wound-up portions 20b, 20b of the spiral springs 20, 20 are fitted into the push-fit portions 40, 40 provided in the lift paths 13a, 13b so that a resistance force F2 acting in opposition to a pressing force F1 of the spiral springs 20, 20 can be applied.

The respective components and portions will be described below in detail. The base member 10 includes a base plate 11 and the holder 12 which are made of metal. The base plate 11 includes a circular rotation table 11a indicated by a dashed line in FIG. 3, and this rotation table 11a is rotatably attached through a bolt 11a$_1$ to a bottom 11b, as shown in FIG. 2. Consequently, the base plate 11 is made rotatable on a vertical axis by this rotation table 11a.

Figure 3:
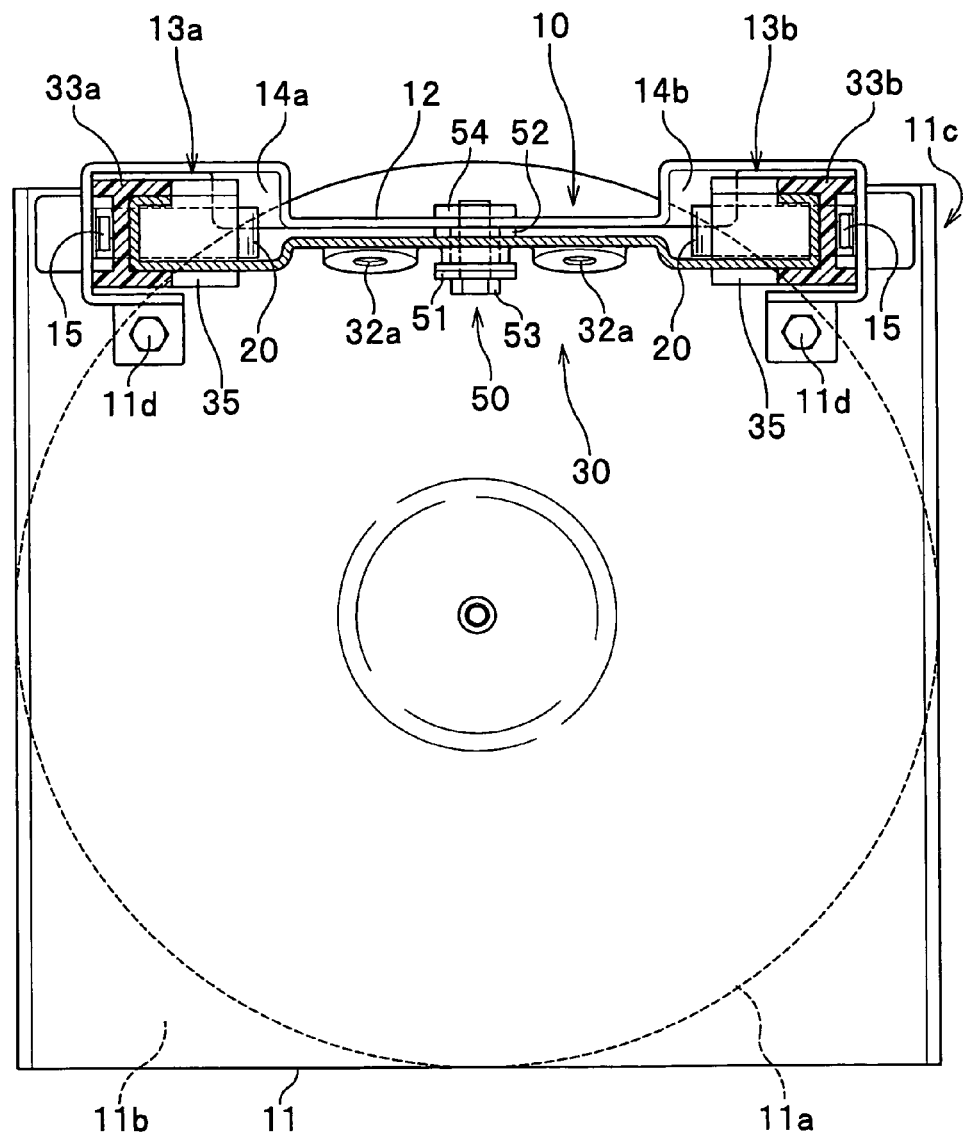
FIG. 3 is a horizontal sectional view showing a holder of the base member and the lift member that is fitted therein.

On the left and right portions of the holder 12, as shown in FIG. 1 and FIG. 3, the lift paths (longitudinal grooves) 13a, 13b, which have substantially U-shaped portions when viewed from its top and guide the upward and downward movement of the lift member 30, are formed vertically along the length of the holder 12. On the central portion of the holder 12, a center guide portion 14, which has a wide width and protrudes on the front side of the holder 12, is formed and sandwiched between the lift paths 13a, 13b. This center guide portion 14 has stepped portions 14a, 14b provided at its borders with the lift paths 13a, 13b, which stepped portions 14a, 14b are formed, as shown in FIGS. 1 and 2, in the shape of downward slopes which gently widen toward the left and toward the right respectively from a position slightly upward relative to a middle elevation of the holder 12 toward downward. These slopes of the stepped portions 14a, 14b make the widths of the lift paths 13a, 13b narrower, so that the push-fit portions 40, 40 are formed.

The push-fit portions 40, 40 are narrower in the width than the outer diameters of the wound-up portions 20b, 20b of the spiral springs 20, 20, and the wound-up portions 20b, 20b are radially compressed according as the lift member 30 is lowered and eventually fitted in the push-fit portions 40, 40. In this embodiment, the push-fit portions 40, 40 are formed such that the slopes of the stepped portions 14a, 14b make their widths narrower toward downward of the holder 12. A vertically oriented oblong through hole 14c, to which is attached an attachment member 50 that will be described later, is formed on the center guide portion 14.

For each of the spiral springs 20, 20, a spring of a thin plate that is tightly wound at a constant curvature is employed, and winding ends 20a, 20a thereof are fastened on hooks 15, 15 formed on the upper portions of the left and right side walls of the lift paths 13a, 13b, respectively. Accordingly, the spiral springs 20, 20 are placed in the upper portions inside the lift paths 13a, 13b, as shown in FIG. 2, and in accordance with the lowering motion of the lift member 30 that will be described later, their wound-up portions 20b, 20b lower along the lift paths 13a, 13b, and are wound off straight from its outer portion. Consequently, the pressing force of the spiral springs 20, 20 is applied toward the direction (raising direction) in which the lift member 30 is pushed up which will be described later. That is, the lift member 30 is configured so as to enable the raising operation with consideration given to the weight of a display D (see FIG. 5) attached to the lift member 30.

As shown in FIG. 1 and FIG. 2, the lift member 30 includes: guides 31a, 31b which are to be inserted into the lift paths 13a, 13b formed in the holder 12 of the base member 10; and a central portion 32 that links the guides 31a, 31b, and the lift member 30 is formed by working a sheet material made of metal through presswork or the like.

Spacers 33a, 33b, which are H-shaped when viewed from its top (see FIG. 3) and made of synthetic resin material, are attached to the guides 31a, 31b. Each of the spacers 33a, 33b has a thickness that can be inserted into and slidably contacted at a moderate friction force with the lift paths 13a, 13b of the holder 12.

Figure 4:
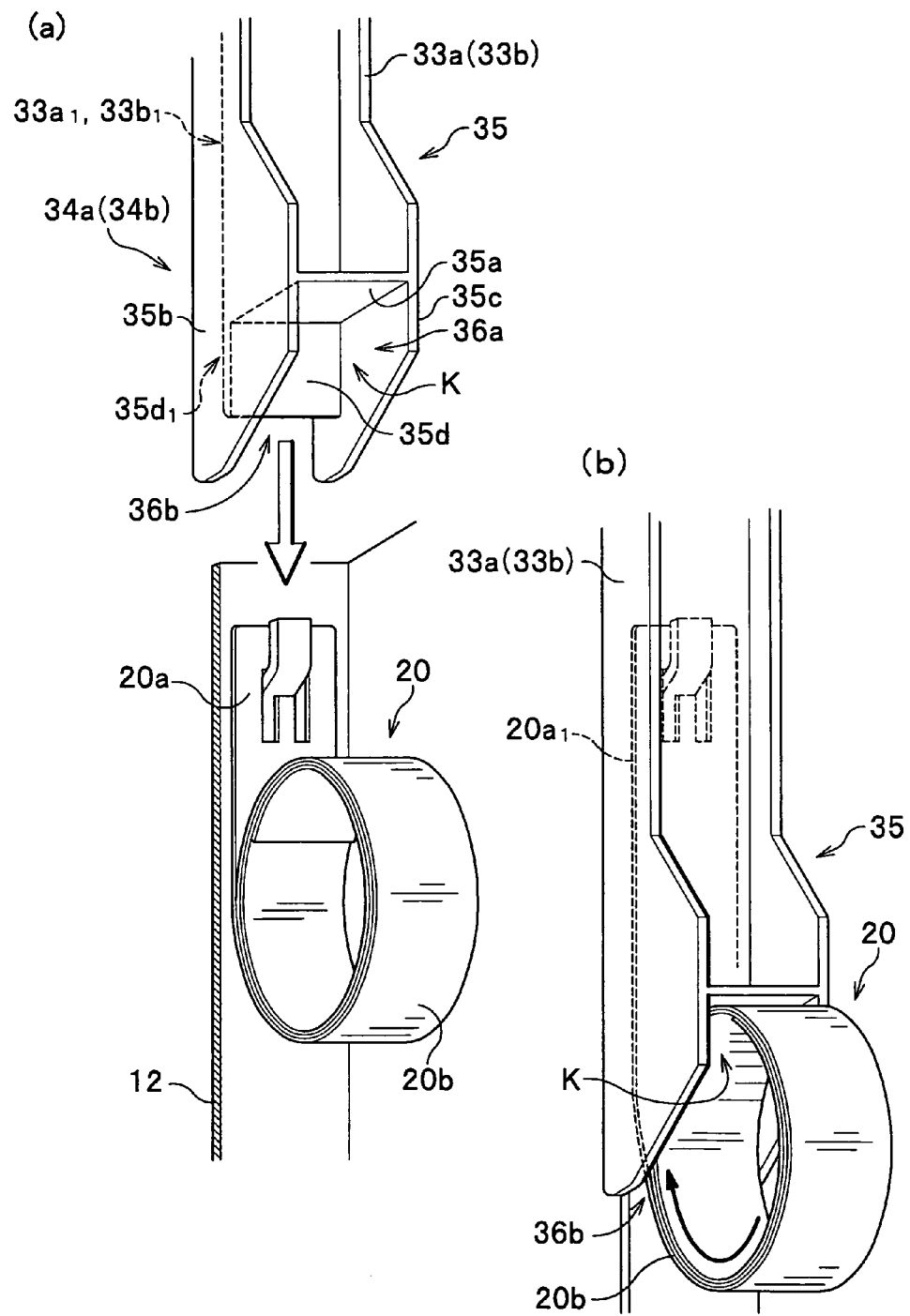
FIG. 4(a) is an enlarged perspective view showing a state before a spiral spring is accommodated in an accommodating portion of a spacer as viewed from obliquely below.
FIG. 4(b) is an enlarged perspective view showing a state where the spiral spring is accommodated in the accommodating portion of the spacer as viewed from obliquely below.

Accommodating portions 35, 35 of substantially triangular shape when viewed from their tops are formed integrally in lower portions 34a, 34b of the spacers 33a, 33b, and the wound-up portions 20b, 20b of the spiral springs 20, 20 are accommodated and held therein, respectively. The accommodating portion 35, when explained with regard to that of the spacer 33a, is provided with a ceiling 35a, a front 35b, a rear 35c and a side 35d, as shown in FIG. 4(a), and is open at another side 36a and a bottom 36b. Here, as shown in FIG. 4(b), the spiral spring 20 is accommodated in a room K formed in this accommodating portion 35, and the wound-off portion of the spring is pulled out from the bottom 36b on an outside $35d_1$ of the side 35d shown in FIG. 4(a). Consequently, when the spiral spring 20 is accommodated in the accommodating portion 35, the circumference of the wound-up portion 20b comes into contact with the ceiling 35a, and the lift member 30 is supported while the pressing force in the upward direction is applied to the lift member 30. At this time, as shown in FIG. 4(b), a spring (stretched-out portion) $20a_1$ wound off from the spiral spring 20 is fed away into a concave portion $33a_1$ (corresponding to a concave portion $33b_1$ in the spacer 33b; see FIG. 4(a)) formed on the outside of the spacer 33a, and is prevented from giving resistance to the lift member 30 during upward and downward movement.

As shown in FIG. 1 and FIG. 2, a total of four attachment holes 32a for attaching the display D (see FIG. 5) are provided on the upper portion of the central portion 32. A longitudinal slot 32b through which to insert a protrusion 51a of a slide stopper 51 of the attachment member 50, which will be described later, is formed on the central portion 32 as shown in FIG. 1.

As shown in FIG. 1, the attachment member 50 includes: the slide stopper 51 made of resin that is attached to the lift member 30 from the front side thereof; a packing spacer 52 made of resin that is placed between the lift member 30 and the holder 12; an attaching bolt 53; and an attaching plate 54 (shown on the rear of the holder 12 in FIG. 1). The attachment member 50 as described above plays a role in preventing the lift member 30 from coming out of the holder 12 and restraining the lift member 30 from falling frontward apart from the holder 12 and moving and clattering in the left and right directions. The protrusion 51a is provided on the slide stopper 51. This protrusion 51a is so long as to penetrate the longitudinal slot 32b of the central portion 32 in the lift member 30, and then penetrate the packing spacer 52 and further penetrate the through hole 14c of the center guide portion 14 of the holder 12. In the packing spacer 52, an oblong hole 52a penetrated by the protrusion 51a of this slide stopper 51 is formed.

The display elevation adjusting apparatus 1 as described above is assembled, for example, as follows.

At first, as shown in FIG. 1 and FIG. 2, bolts 11d, 11d are used to fix the holder 12 upright onto the rear portion 11c of the base plate 11. After that, the winding ends 20a, 20a of the spiral springs 20, 20 are hooked on the hooks 15, 15 in the lift paths 13a, 13b of the holder 12, respectively, and the spiral springs 20, 20 are placed on the upper positions inside the lift paths 13a, 13b. Next, the spacers 33a, 33b of the lift member 30 are inserted into the lift paths 13a, 13b of the holder 12, respectively, to push down the lift member 30, so that the lift member 30 is installed to the holder 12. Then, the wound-up portions 20b, 20b of the spiral springs 20, 20 are accommodated and held in the accommodating portions 35, 35 of the spacers 33a, 33b in the lift member 30, respectively (see FIG. 4(b)), so that the wound-up portions 20b, 20b can be lowered in accordance with the lowering motion of the lift member 30.

Next, while the packing spacer 52 of the attachment member 50 is aligned with the through hole 14c from, and held on, the front of the center guide portion 14 in the holder 12, the protrusion 51a of the slide stopper 51 is inserted into the longitudinal slot 32b of the lift member 30, and the lift member 30 is pushed down to the position at which this protrusion 51a can be penetrated through the packing spacer 52 to the through hole 14c of the holder 12, and then the protrusion 51a of the slide stopper 51 is inserted into the through hole 14c. In this state, the bolt 53 is inserted into the slide stopper 51, and the bolt 53 is screwed into the attaching plate 54 placed on the rear of the holder 12. Consequently, the lift member 30 can be attached to the holder 12, and the display elevation adjusting apparatus 1 is assembled. After that, a bolt (not shown) is used to fix the display D (see FIG. 5) to the attachment hole 32a of the lift member 30 in the display elevation adjusting apparatus 1 (see FIG. 1 and FIG. 2).

In the thus-assembled display elevation adjusting apparatus 1, since the packing spacer 52 is placed between the lift member 30 and the holder 12, no unpleasant noise would generate, such as scratching between the metal members caused by the upward or downward movement of the lift member 30 and the like, and so-called galvanic corrosion caused by the contact between the metals is prevented.

The display elevation adjusting apparatus 1 is usually designed to accept an arbitrary height adjustment of the lift member 30. Alternatively, by adjusting the fastening force of the bolt 53 in the attachment member 50, the operation feeling at the time of the elevation of the lift member 30 can be made lighter or heavier, and the lift member 30 can be fixed to a desirable height so as to prevent upward and downward movement thereof.

Figure 6:
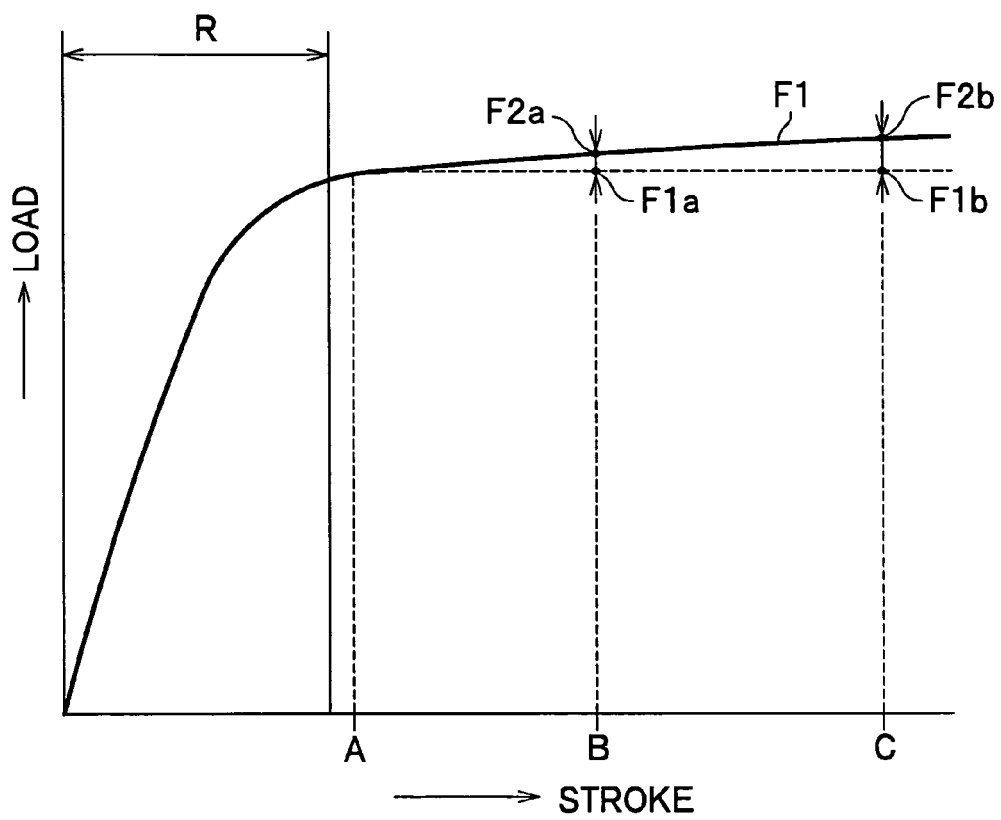
FIG. 6 is a graph for showing the load characteristics of the spiral spring.

Each of the spiral springs 20, 20 characteristically has a region R in load characteristics where the load is sharply increased from the weak state at the initial stage of winding off as shown in FIG. 6. This embodiment is designed to start the winding-off operation (the lowering of the lift member 30) of the spiral springs 20, 20 from a stroke position exceeding this region R. That is, as shown in FIG. 7(c), the spiral springs 20, 20 are attached to the holder 12 of the base member 10 in the slightly lowered state where a portion thereof corresponding to the region R has been pulled out in advance, even when the lift member 30 is located at the top end position.

The operations of the display elevation adjusting apparatus in this embodiment will be described below with reference to the graph of FIG. 6 and FIGS. 7(a)-(c). In FIGS. 7(a)-(c), illustration of the display D is omitted, and the operations are explained, taking as an example a case where the raising adjustment is carried out from the state where the lift member 30 is located near the lower end.

At first, the spiral springs 20, 20 attached to the display elevation adjusting apparatus 1 have the typical characteristics, and their loads (pressing forces) tend to gradually increase after the passage of the region R, as shown by the solid line in FIG. 6. Thus, the loads (pressing forces) are different between a case when the lift member 30 is located at a position (symbol C) near the lower end, a case when it is located at a middle position (symbol B) and a case when it is located at a position (symbol A) near the upper end, respectively.

Figure 7:
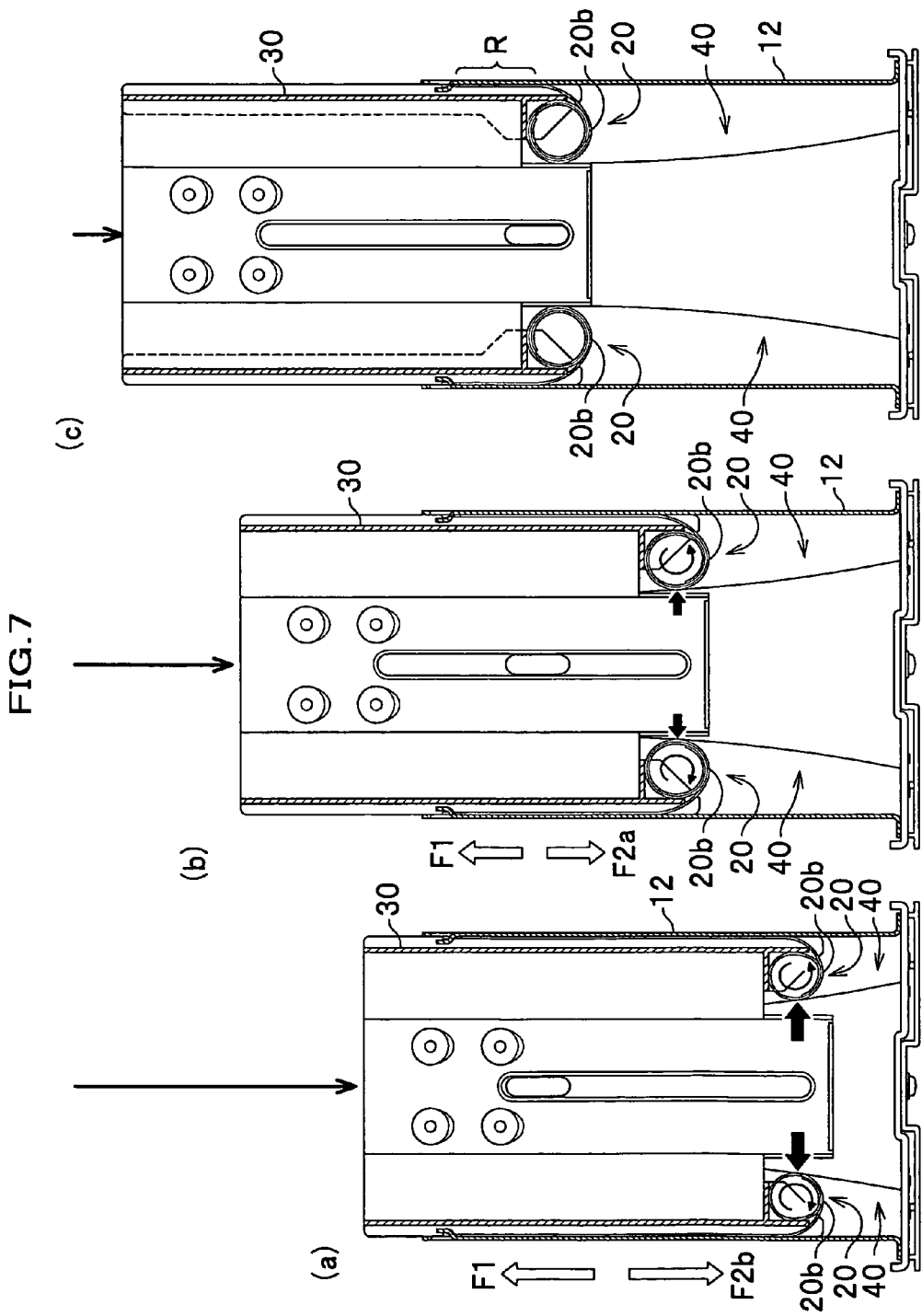
FIGS. 7(a)-(c) are views for explaining operation.

As shown in FIG. 7(a), in a state where the lift member 30 is lowered to the position near the lower end, the wound-up portions 20b, 20b, which are wound off in accordance with the lowering action of the lift member 30, are fitted in the push-fit portions 40, 40. The push-fit portions 40, 40 are narrower in widths than the outer diameters of the wound-up portions 20b, 20b, and the wound-up portions 20b, 20b are fitted in the states compressed in the diameter directions. Thus, the wound-up portions 20b, 20b, which are fitted in the push-fit portions 40, 40, come in the state where their circumferences are in strong contact with the sides 35d (35d) of the accommodating portions 35 (35) of the spacers 33a (33b) and the stepped portions 14a (14b). Consequently, the wound-up portions 20b, 20b are held by the push-fit portions 40, 40 under the friction forces proportional to the resistance forces resulting from the spring forces in the diameter directions.

That is, in a case when the raising adjustment is carried out starting from a state where the lift member 30 is located near the lower end, the friction force proportional to the resistance force acts as a resistance force F2b in opposition to the pressing force F1 (see an outlined white arrow in FIG. 7(a)) of the spiral springs 20, 20. As a result, the pressing force F1 acting in the upward direction against the lift member 30 is made weaker. Consequently, the pressing force F1 is reduced by an amount corresponding to the force F2b in opposition to the pressing force F1, at the stroke position (near the lower end) indicated by the symbol C in FIG. 6. Actually, the pressing force F1 is reduced to the magnitude indicated by a symbol F1b. Thus, when the raising adjustment from the position near this lower end is performed on the lift member 30, the pressing force F1b made weaker than the usual pressing force F1 is applied to the lift member 30. Hence, the raising adjustment can be performed with the operation force substantially equal to the operation force at the stroke position (the position near the upper end) indicated by the arrow A in FIG. 6. That is, even if the stroke position is changed, the operation force when the raising adjustment is performed on the lift member 30 is not substantially changed.

Next, a case when a raising adjustment is performed starting from the state where the lift member 30 is located at the substantially middle position in the height direction of the holder 12 as shown in FIG. 7(b) is explained. In this case as well, the wound-up portions 20b, 20b of the spiral springs 20, 20 are fitted in the push-fit portions 40, 40, and the resistance force F2a acts in opposition to the pressing force F1 of the spiral springs 20, 20. As a result, the pressing force F1 in the upward direction against the lift member 30 is made weaker. In this case, the widths of the push-fit portions 40, 40 are greater as compared with the state where the lift member 30 is located near the lower end as mentioned above. Accordingly, the friction force proportional to the resistance force is made weaker. To illustrate the pressing force F1 in this instance, referring to FIG. 6, the pressing force F1 is reduced by an amount corresponding to the resistance force F2a, at the stroke position (the position at the substantially middle position in the height direction of the holder 12) indicated by the symbol B in FIG. 6. Actually, the pressing force F1 is reduced to the magnitude indicated by the symbol F1a.

Thus, when the raising adjustment from this position is performed to the lift member 30, the pressing force F1a made weaker than the usual pressing force F1 is applied to the lift member 30, and the operation force becomes substantially equal to the stroke position indicated by the symbol C in FIG. 6 and explained above. The forces (F2a, F2b) in opposition to the pressing force F1, although not explained by using the symbol in the graph of FIG. 6, are generated while the wound-up portions 20b, 20b of the spiral springs 20, 20 are fitted in the push-fit portions 40, 40.

As shown in FIG. 7(c), when the lift member 30 is raised to the upper end (near the upper end) of the holder 12, the wound-up portions 20b, 20b of the spiral springs 20, 20 come off the push-fit portions 40, 40, so that the opposite force stops to act, and only the pressing force F1 of the spiral springs 20, 20 remain (at the stroke position indicated by the symbol A in FIG. 6: the initial state before the spiral springs 20, 20 are wound off).

That is, according to the display elevation adjusting apparatus 1 in this embodiment, the operation force required when the raising adjustment is performed to the lift member 30 is not changed in the substantially entire range of strokes. Thus, the raising adjustment can be performed with a constant operation feeling.

Figure 5:
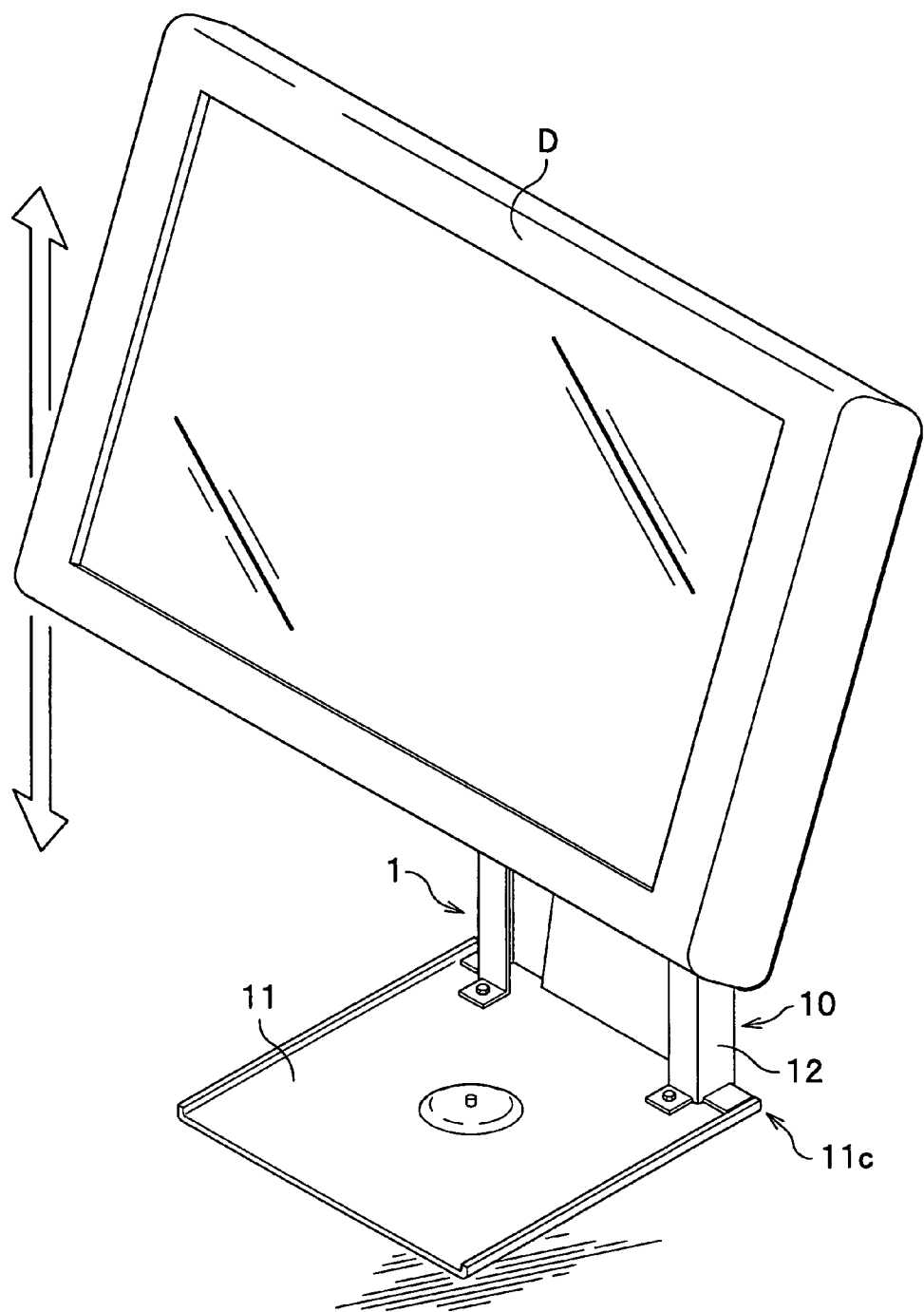
FIG. 5 is a perspective view showing the display elevation adjusting apparatus to which a display is attached.
Figure 8:
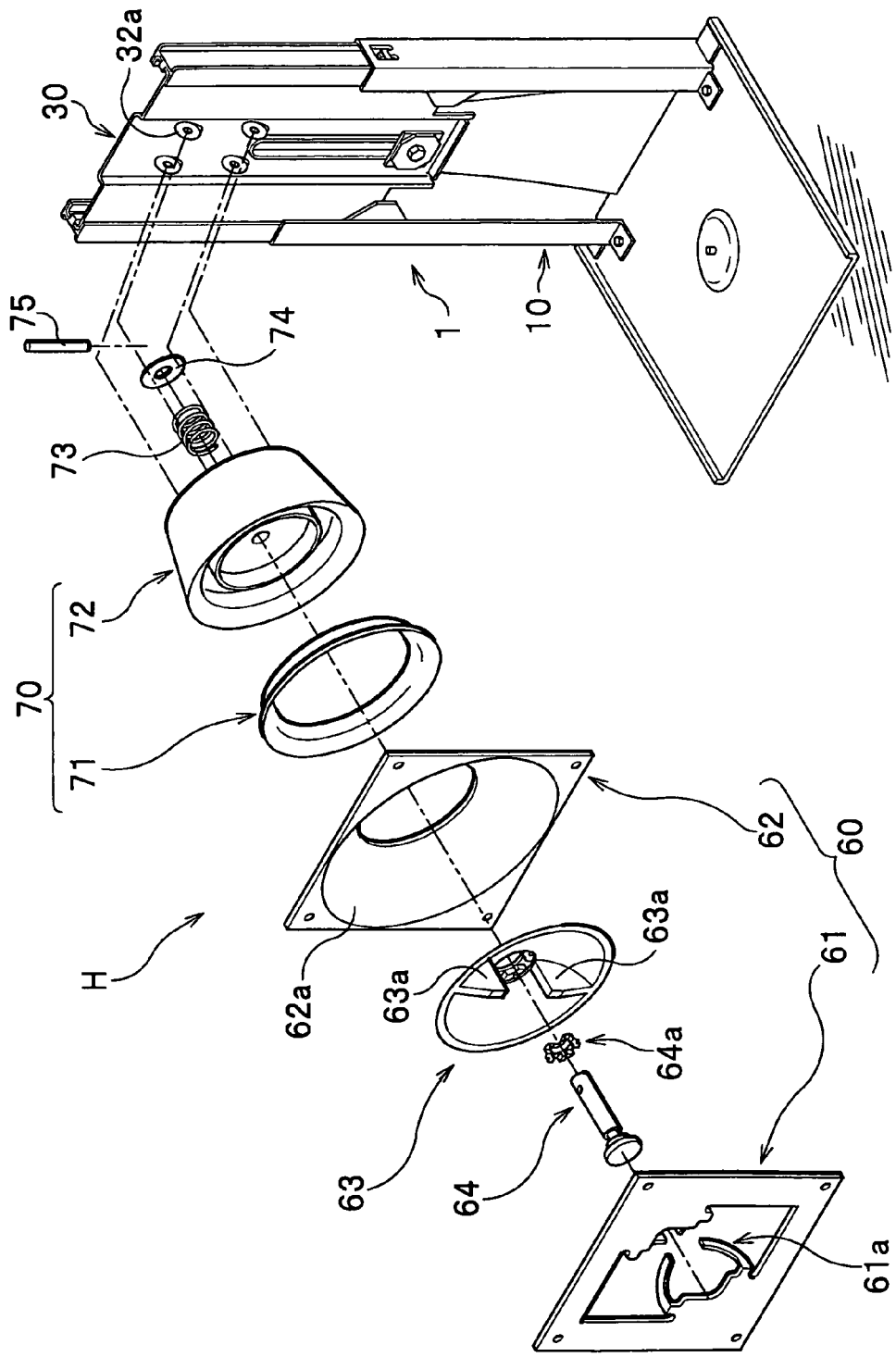
FIG. 8 is an exploded perspective view for explaining an orientation adjusting apparatus.

Meanwhile, in this embodiment, an orientation adjusting apparatus that can hold the display D in a portrait or landscape orientation (as shown in FIG. 5) is used to attach the display D to the lift member 30. FIG. 8 is an exploded perspective view for explaining this orientation adjusting apparatus H.

As shown in the same drawing, the orientation adjusting apparatus H includes a movable unit 60 and a base 70 that is fixed through a bolt (not shown) to the attachment hole 32a of the lift member 30 of the display elevation adjusting apparatus 1. The movable unit 60 includes a frame part 61 and a plate part 62 which are put one upon the other and attached to the rear (not shown) of the display D. Between the frame part 61 and the plate part 62, are provided a support cap 63 and a co-rotation restricting member 64 to regulate a rotation angle of the display D.

Rotation regulating portions 61a each shaped like a tongue for regulating the rotation angle are provided at intervals of 90 degrees in the frame part 61. Wall portions 63a, 63a, with which these rotation regulating portions 61a are to be brought into contact and which thus serve as stoppers, are provided perpendicularly on the front of the opposite support cap 63. The co-rotation restricting member 64 is inserted through a clutch member 64a into the support cap 63.

This co-rotation restricting member 64 is inserted through a spacer 71 and a base body 72 in the backwardly placed base 70 into a pressing member 73 and then inserted into a washer 74, and a pin 75 is inserted therein. Both ends of this pin 75 are engaged with notches formed on the rear (not shown) of the base body 72, and thus, the co-rotation restricting member 64 cannot be rotated on its axial line. On the other hand, the notches are formed so deep in the axial direction of the co-rotation restricting member 64 that the co-rotation restricting member 64 can move in the axial direction.

Accordingly, the support cap 63 is put in a state where the support cap 63 is being pressed under moderate pressure against a spherical zone portion 62a of the plate part 62 in the movable unit 60 by the pressing force of the pressing member 73 while engaging with the co-rotation restricting member 64 configured so as not to be rotatable, and thus is configured so as not to be rotatable for the base body 72. This makes the movable unit 60 rotatable within a range of 90 degrees that is a range defined by the wall portions 63a, 63a of the support cap 63 with which the rotation regulating portion 61a of the frame part 61 is brought into contact.

The clutch member 64a is configured to release engagement between the support cap 63 and the co-rotation restricting member 64, to thereby release the restriction established by the wall portions 63a, 63a, when the rotation force of a predetermined value or more is applied by the rotation regulating portion 61a of the frame part 61 to the wall portions 63a, 63a that has restricted the rotation of the movable unit 60.

The use of such an orientation adjusting apparatus H makes it possible to rotate the display D clockwise or counterclockwise so that the display D may be arranged in either of a portrait orientation or a landscape orientation as preferred by a user. Moreover, even when the display D is rotated in a restricted direction of rotation corresponding to the rotation of the movable unit 60 that is being restricted by the wall portions 63a, 63a, the clutch member 64a releases the engagement between the support cap 63 and the co-rotation restricting member 64. Thus, the movable unit 60 is rotated beyond a permitted range of movement. Hence, even if an undue rotation is attempted, the movable unit 60 and the support cap 63 will never be broken.

According to the display elevation adjusting apparatus 1 in this embodiment as mentioned above, the lift member 30 is placed so as to move up and down along the lift paths 13a, 13b formed in the holder 12, and pressed in the upward direction relative to the holder 12 by the spiral springs 20, 20. Thus, the adjustment to the upward direction of the display D can be carried out with a light operation force with the help of the pressing force of the spiral springs 20, 20.

The spiral springs 20, 20 are wound up and off according as the lift member 30 moves up and down with the wound-up portions 20b, 20b moving up and down along the lift paths 13a, 13b, and the lift paths 13a, 13b have push-fit portions 40, 40 of which widths are narrower than the outer diameters of the wound-up portions 20b, 20b, and in which according as the lift member 30 is lowered, the wound-up portions 20b, 20b are fitted in such a manner that the wound-up portions 20b, 20b become radially compressed. Therefore, when the lift member 30 is lowered, the wound-up portions 20b, 20b can be fitted into the push-fit portions 40, 40, and held in the push-fit portions 40, 40 with a frictional force proportional to the resistance force caused by the spring force in the radial direction. That is, the frictional force proportional to the resistance force acts as the forces (F2b, F2a) in opposition to the pressing force F1 (see FIGS. 7(a), 7(b)) of the spiral springs 20, 20. As a result, the pressing force F1 in the upward direction applied to the lift member 30 is made weaker. Hence, by providing such push-fit portions 40, 40 at any desirable positions in the lift paths 13a, 13b, it is possible to adjust the operation force at the time of the raising adjustment and consequently possible to obtain the operation feeling corresponding to the preference of the user.

Further, in this embodiment, since the push-fit portions 40, 40 are formed long in the elevation directions of the lift paths 13a, 13b, it is possible to extend the state where the wound-up portions 20b, 20b are fitted in the push-fit portions 40, 40. Consequently, the operation feeling at the time of the raising adjustment can be adjusted well for a long range of the lift paths 13a, 13b.

Further, since the push-fit portions 40, 40 are formed such that their widths become narrower toward downward of the lift paths 13a, 13b, the frictional force proportional to the resistance force of the wound-up portions 20b, 20b fitted in the push-fit portions 40, 40 become stronger as the lift member 30 moves down. That is, the pressing force F1 of the spiral springs 20, 20 which is increased with the lowering of the lift member 30 in the usual case can be canceled out by the opposite force caused by the frictional force which is made stronger as the lift member 30 moves down. Hence, an adjustment can be made so that the operation feeling at the time of the raising adjustment is kept constant.

Second Embodiment

Figure 9:
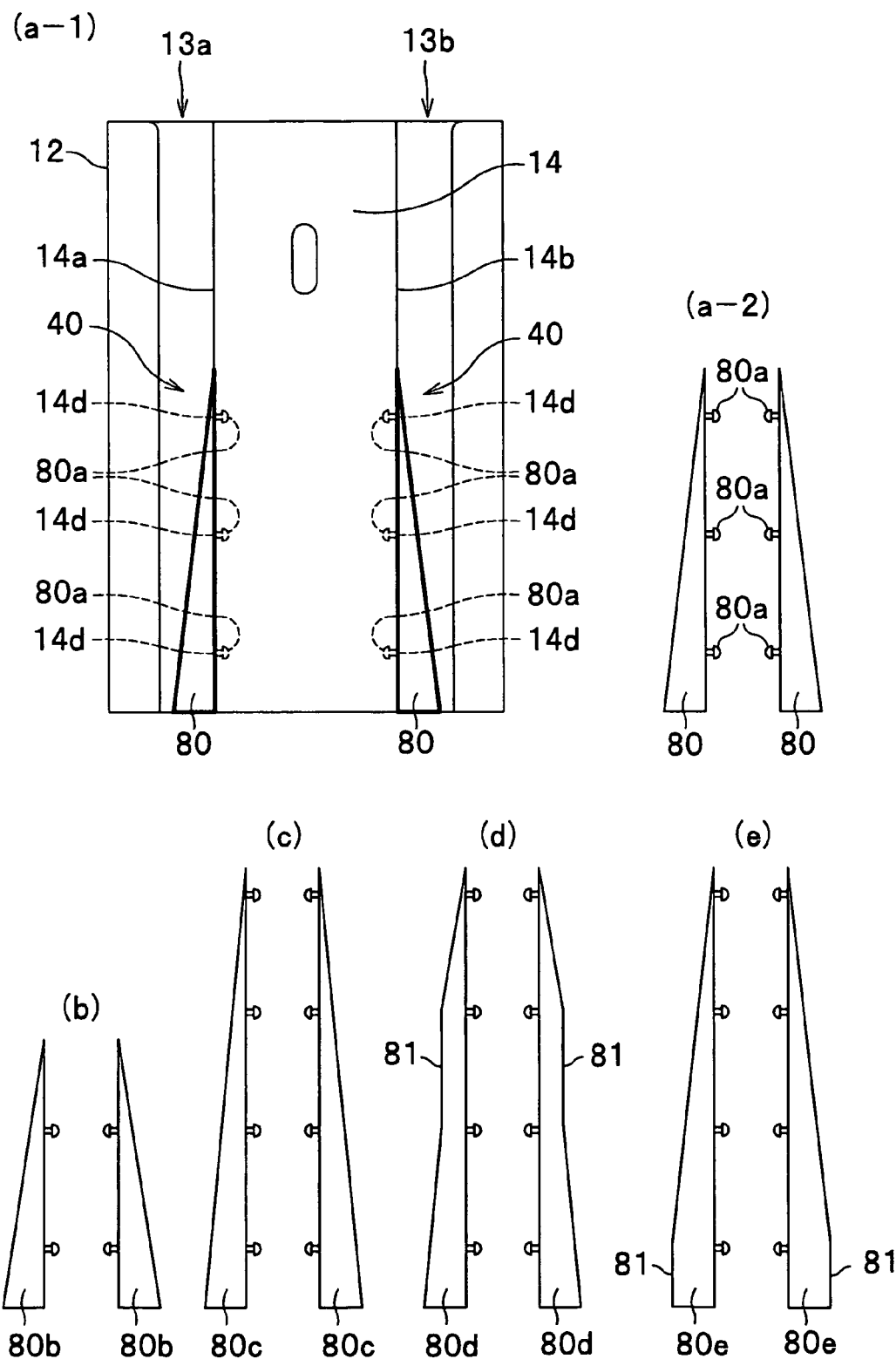
FIG. 9 is a view for explaining a display elevation adjusting apparatus according to a second embodiment; (a-1) is a schematic front view of a holder, and (a-2) is a front view showing a space member for forming a push-fit portion shown in (a-1), and (b)-(e) are front views showing other examples of the space member for forming the push-fit portion.

FIG. 9 is a view explaining a display elevation adjusting apparatus according to a second embodiment, in which (a-1) is a schematic front view of a holder, (a-2) is a front view showing a space member for forming the push-fit portions shown in (a-1), and (b)-(e) are front views showing other examples of the space member for forming the push-fit portions.

The difference of the display elevation adjusting apparatus according to this embodiment from that of the first embodiment lies in space members 80, 80 provided therein for forming the push-fit portions 40, 40, which space members 80, 80 are installed so as to be attachable to and detachable from the lift paths 13a, 13b of the holder 12.

As shown in FIG. 9(a-1), the holder 12 has a uniform width in the entire upper and low directions of the holder 12, and the attachment holes 14d used to attach the space members 80, 80 are formed in the stepped portions 14a, 14b, respectively. Each of the space members 80, 80 is shaped like a triangle whose apex is acute, as seen also in FIG. 9(a-2), and a plurality of fitting protrusions 80a that can be detachably fitted in the respective attachment holes 14d are formed on its side.

According to such a display elevation adjusting apparatus, by fitting the fitting protrusions 80a of the space members 80, 80 into the attachment holes 14d of the lift paths 13a, 13b in the holder 12, respectively, the space members 80, 80 can be attached to the lift paths 13a, 13b of the holder 12, to thereby form the push-fit portions 40, 40. On the other hand, by detaching the fitting protrusions 80a of the space members 80, 80 from the respective attachment holes 14d of the lift paths 13a, 13b of the holder 12, the space members 80, 80 can be detached from the lift paths 13a, 13b, to thereby restore the original states.

Consequently, when the space members 80, 80 are attached to form the push-fit portions 40, 40 in the lift paths 13a, 13b, the desirable operation feeling can be obtained at the time of the raising adjustment. Also, when thus-attached space members 80, 80 are detached, the original operation feeling can be restored.

As shown in FIGS. 9(b)-(e), several kinds of space members 80b-80e for providing desired shapes (the fitting widths from which desirable resistance forces can be obtained) may be prepared, so that the space members can be replaced thereby. The space members 80b, 80b shown in FIG. 9(b) are shorter in length (height) than those shown in FIG. 9(a-2); accordingly, the resistance force resulting from the push-fit portions 40, 40 appears intensively near the lower end of the stroke of the lift member 30. The space members 80c, 80c shown in FIG. 9(c) are longer in length (height) than those shown in FIG. 9(a-2); accordingly, the resistance force is applied in the entire stroke, and the operation feeling can be made more constant. The space members 80d, 80d shown in FIG. 9d have straight portions 81, 81 formed in the middle of slopes, and the push-fit portions 40, 40 can be designed so that the resistance forces is not increased along the length of the straight portions 81, 81 in the push-fit portions 40, 40. Alternatively, the space members 80e to 80e shown in FIG. 9e have straight portions 81, 81 formed in the end portions in the slopes that are the lower ends of the stroke, and the resistance forces can be configured so as not to be increased near the lower ends of the stroke. In this way, by replacing the space members 80, 80 with those having the different shapes, it is possible to obtain the operation feeling corresponding to the preference of the user.

Here, when the display elevation adjusting apparatus in this embodiment is configured as an apparatus commonly applicable to various types of displays D, several kinds of space members may be prepared corresponding to the product weights of the displays D to be attached, to thereby obtain the following operations and advantages. That is, the displays D whose product weights are different from one model to another are attached to the display elevation adjusting apparatus configured as an apparatus commonly applicable to the various types of displays D, the balances between the product weights of the displays D and the pressing force of the spiral springs 20, 20 may become different. Thus, the operation feeling at the time of the raising adjustment would be different depending on the product weight of the attached display D.

In such a case, if the moderate resistance force corresponding to the product weight of the display D can be applied against the pressing force of the spiral springs 20, 20, even if the product weight of the display D is different, the operation feeling at the time of the raising adjustment can be made unchanged.

So, the several kinds of the space members that can apply the moderate resistance forces corresponding to the product weights of the displays D are prepared, and the space members adapted to the displays D are attached thereto. Thus, it is possible to attain the display elevation adjusting apparatus of which the operation feeling at the time of the raising adjustment is not changed.

Specifically, for example, among the displays D to be attached, a display D having the heaviest product weight is defined as a reference display D, and the spiral springs 20, 20 having the loads corresponding thereto and the space members for applying the resistance forces corresponding thereto are installed. Then, space members are prepared to apply an appropriate resistance force to the above spiral springs 20, 20 as a reference when the other display D having a lighter product weight is attached. Accordingly, when the display D having the lighter product weight is attached instead of the display D having the heaviest product weight, the space member is replaced with one corresponding to the display D.

In this instance, when the display D is replaced with one having a lighter product weight, if the space members are not changed, the pressing force of the spiral springs 20, 20 remains stronger than the resistance force resulting from the push-fit portions 40, 40 formed by the space members. Thus, the balance between the pressing force and the resistance force is destroyed, and there may be a fear that the operation feeling at the time of the raising adjustment would become greatly different. On the contrary, when the space member is replaced with one corresponding to the product weight of the display D, a moderate resistance force can be applied.

That is, the display D defined as a reference is the display D having the heaviest product weight. Thus, when the display D is subsequently replaced with one having a lighter product weight, the pressing force is stronger than the resistance force without fail. Such imbalance can be absorbed by application of the stronger resistance force caused by replacement of the space members 80, 80. Hence, the necessity for replacing the spiral springs 20, 20 themselves with the other ones from which the different pressing forces are obtained and the like is obviated. Consequently, the display elevation adjusting apparatus which is low in cost and excellent in universal applicability is obtained.

The space members 80, 80 may be fixed to the push-fit portions 40, 40 by using adhesive or a fixed screw so that they cannot be detached.

Third Embodiment

Figure 10:
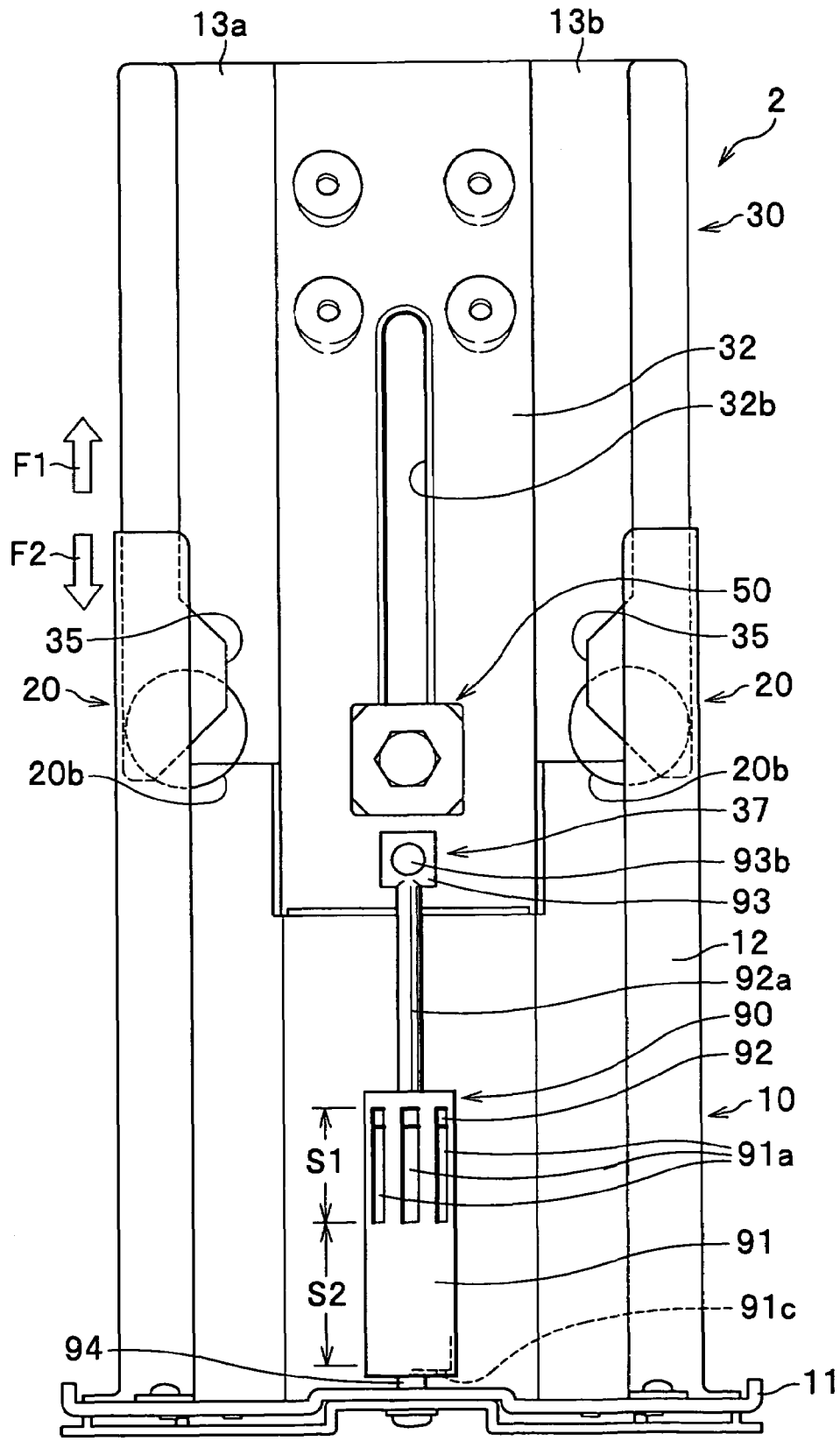
FIG. 10 is a front view showing a display elevation adjusting apparatus according to a third embodiment of the present invention.
Figure 11:
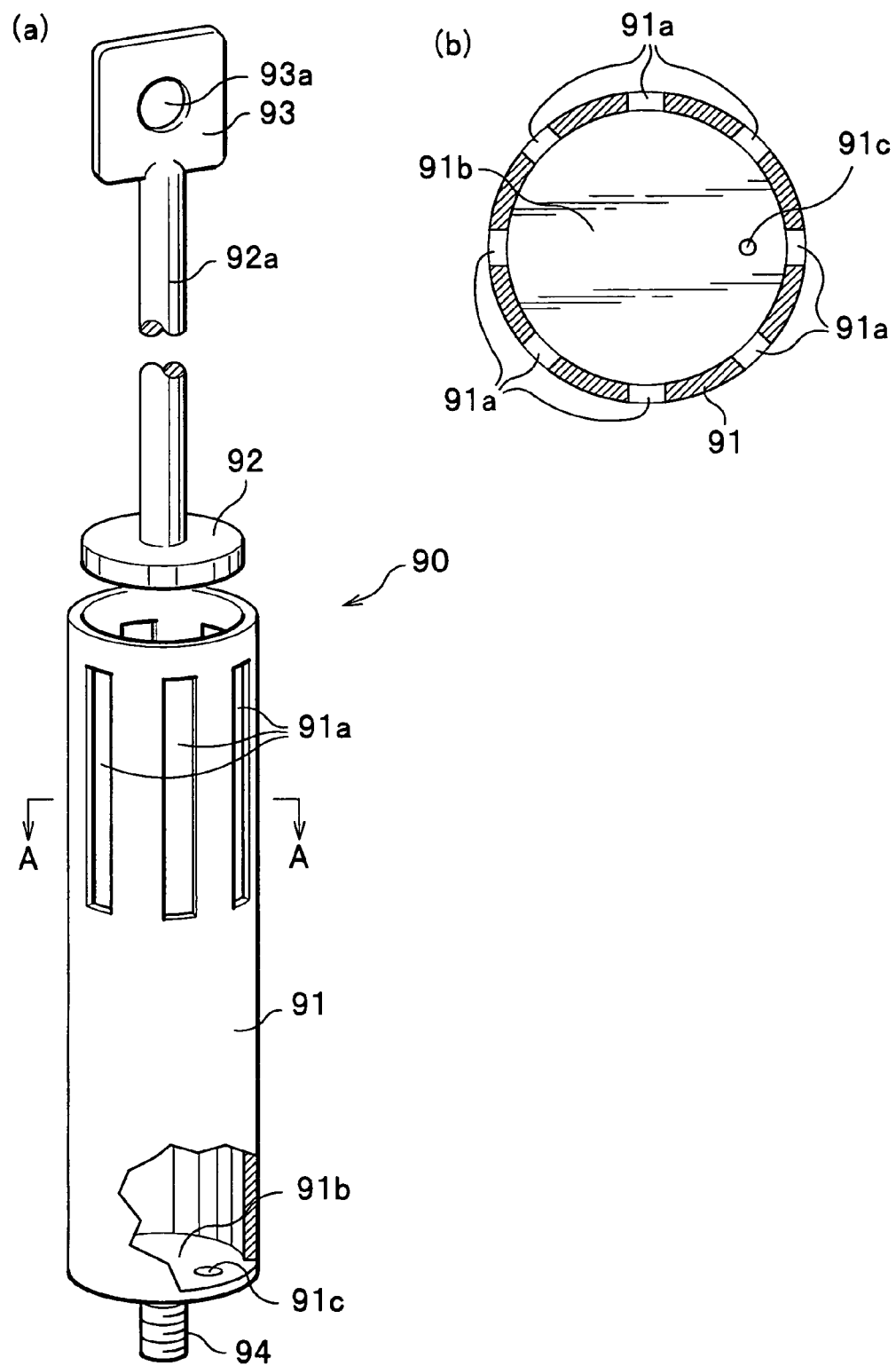
FIG. 11(a) is an enlarged perspective view of a damper (a part thereof is cut away)
FIG. 11(b) is a sectional view taken along of a line a-a of (a).
Figure 12:
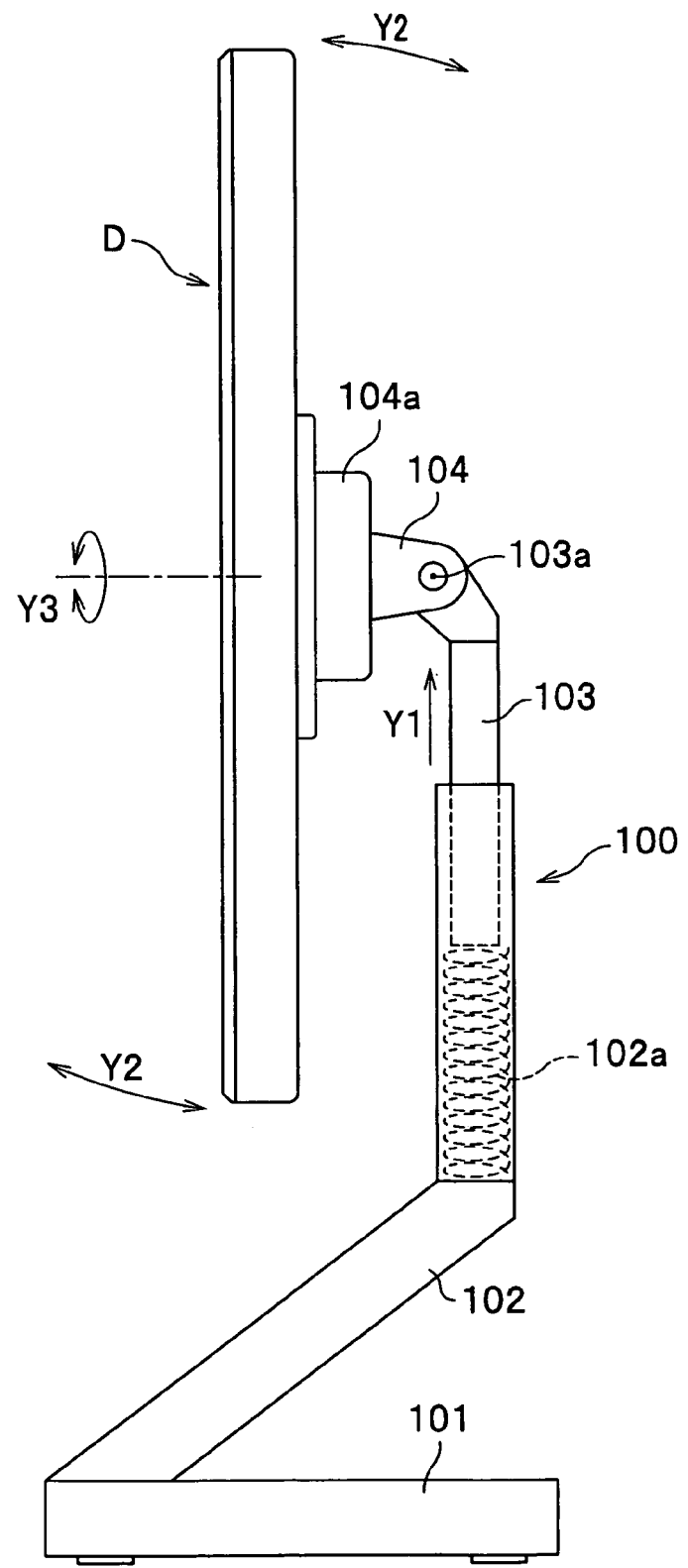
FIG. 12 is a side view showing a conventional supporting device of a liquid crystal monitor.

FIG. 10 is a front view showing a display elevation adjusting apparatus according to a third embodiment of the present invention, in which FIG. 11(*a*) is an enlarged perspective view (a part is cut away) of a damper, and (*b*) is a cross-sectional view taken along line a-a of (*a*). The display elevation adjusting apparatus of this embodiment is different from those of the first and second embodiments in that a damper 90 for reducing a raising speed of the lift member 30 is placed between the base member 10 and the lift member 30, and that the push-fit portions 40, 40 (see FIG. 2) is not formed in the lift paths 13*a*, 13*b* of the base member 10.

The damper 90 includes a cylinder 91 and a piston 92 that is provided, and allowed to reciprocate, in this cylinder 91, as shown in FIG. 11(*a*). The cylinder 91 has a shape of a hollow cylinder having an upper end open to outside and a lower end closed with a bottom 91*b*, and a plurality of longitudinal slits 91*a* to connect the inside and outside of the cylinder 91 are formed in the circumferential wall substantially along the length of an upper half thereof (see FIG. 11(*b*)). A communicating hole 91*c* of a small diameter to connect the inside and outside of the cylinder 91 is formed in the bottom 91*b* of the cylinder 91. Also, an attachment screw 94 is attached vertically to the bottom 91*b* of the cylinder 91, and the cylinder 91 is attached by screwing this attachment screw 94 into a screw hole (not shown) formed in the base plate 11 of the base member 10, as shown in FIG. 10.

A piston rod 92*a* is integrally linked to the piston 92, and an attachment portion 93 having an attachment hole 93*a* is integrally formed on the upper end of this piston rod 92*a*. The attachment portion 93 is fixed by a bolt 93*b* to a lower central portion 37 of the lift member 30, as shown in FIG. 10.

In this embodiment, the dimensions of the respective portions are adjusted such that the piston 92 is located near the upper end of the cylinder 91, when the lift member 30 is located at the upper end position (as shown in FIG. 10). Consequently, when the lift member 30 is lowered from an upper end position to a lower end position, the piston 92 moves down from a block S1 where the slits 91*a* are formed to a block S2 where the slits 91*a* are not formed. On the other hand, when the lift member 30 is raised from the lower end position to the upper end position, the piston 92 moves up through the block S2 to the block S1.

Here, in the block S1 are formed the slits 91*a*, which enables smooth upward and downward movement of the piston 92. In contrast, no slits 91*a* are formed in the block S2; thus, when the piston 92 is in this block S2, an air chamber closed with the piston 92 is formed inside the cylinder 91. Hence, the piston 92 receives the damping caused by the air chamber during its upward or downward movement, in this block S2. The damping of the piston 92 in this block S2 depends upon the quantity of air flowing through the communicating hole 91*c* formed in the bottom 91*b* of the cylinder 91. In this embodiment, the size of the communicating hole 91*c* is set such that the raising (lowering) speed of the lift member 30 is reduced in the block S2.

Next, the operation of the display elevation adjusting apparatus in this embodiment will be described below. To illustrate, the discussion of the operation that will be given below relates to a raising adjustment that is performed by raising the lift member 30 initially located near the lower end.

When the lift member 30 has been lowered to a position near the lower end, the wound-up portions 20b, 20b of the spiral springs 20, 20 have been wound off in accordance with the lowering of the lift member 30, and the lift member 30 is being pressed in the upward direction. In the damper 90, on the other hand, the piston 92 is located in the block S2 of the cylinder 91, and the piston 92 is receiving the damping caused by the air chamber during the upward or downward movement.

When the raising adjustment is performed starting from this state to the lift member 30, the lift member 30 receives the damping caused by the damper 90, which reduces the raising speed of the lift member 30, so that the lift member 30 slowly moves up. This prevents a phenomenon in which the lift member 30 jumps up sharply by the pressing force of the spiral springs 20, 20. That is, when the raising adjustment is performed to the lift member 30, the damping caused by the damper 90 acts as the force in opposition to the pressing force of the spiral springs 20, 20. As a result, the pressing force in the upward direction relative to the lift member 30 is made weaker. The damping caused by this damper 90 is always generated while the piston 92 is being raised in the block S2.

Thereafter, when a raising adjustment is further performed to the lift member 30, the piston 92 of the damper 90 moves up from the block S2 to the block S1, and the damping caused by the damper 90 is released. At this time, the pressing force resulting from the spiral springs 20, 20 is made weaker by a magnitude corresponding to the above raising operation of the lift member 30. Thus, even if the damping caused by the damper 90 is released, the phenomenon in which the lift member 30 jumps up sharply is never generated. That is, according to the display elevation adjusting apparatus in this embodiment, the operation force when the raising adjustment is performed to the lift member 30 is not changed in the substantially entire stroke. Hence, the raising adjustment can be performed under the substantially constant operation feeling.

Optionally, an elastic member made of materials such as rubber may be provided to the communicating hole 91c of the bottom 91b in the damper 90 so as to adjust the flow of air. Since the damper 90 may be configured otherwise so long as it can reduce the speed of upward movement of the lift member 30 when the lift member 30 is in the lower position, a valve (not shown) may alternatively be provided in the communicating hole 91c so that air is smoothly discharged from the communicating hole 91c during the lowering adjustment.

As for the slits 91a, a lower portion or lower-end portion of each slit 91a may be made into a tapered shape (e.g., a shape narrowing toward the lower end). With the thus-tapered shape, the damping force of the damper 90 varying as a display (not shown) is raised or lowered, as shown in FIG. 10, may be continuously variable when the piston 92 is moved from the block S2 to the block S1 or from the block S1 to the block S2, so that the smoother operation feeling can be attained.

The display elevation adjusting apparatus according to the first and second embodiments may be implemented with the slopes of the stepped portions 14a, 14b making up the push-fit portions 40, 40 and/or the slopes of the space members 80, 80 curved or corrugated. The push-fit portions 40, 40 may be formed partially in the lift paths 13a, 13b. The spiral springs 20, 20 for use in the display elevation adjusting apparatus according to each embodiment may have thicknesses and plate widths varying according to the unwound quantity. Also, as the spiral springs 20, 20, those wound at different curvatures may be employed.

Although the exemplary embodiments of the present invention have been described above, various modifications and changes may be made to the embodiments without departing from the spirit and scope of the present invention as defined in the following claims.

The invention claimed is:

1. A display elevation adjusting apparatus comprising: a base member; a lift member which is provided in, and allowed to move up and down along, a lift path formed in the base member and to which a display is to be attached; and a spiral spring which is placed between the base member and the lift member to press the lift member in an upward direction relative to the base member, wherein the spiral spring has a winding end fixed on the base member, and is wound up and wound off according as the lift member moves up and down with a wound-up portion thereof moving up and down along the lift path while keeping in contact with the lift member located upward, and wherein the lift path has a push-fit portion of which a width is narrower than an outer diameter of the wound-up portion, and in which according as the lift member is lowered, the wound-up portion is fitted in such a manner that the wound-up portion becomes radially compressed, wherein the push-fit portion is formed such that the width becomes narrower toward downward of the lift path.

2. The display elevation adjusting apparatus according to claim 1, comprising a space member for forming the push-fit portion which space member is attached to the lift path of the base member to form the push-fit portion.

3. The display elevation adjusting apparatus according to claim 2, wherein the space member is attachable to and detachable from the lift path of the base member.

* * * * *